Patented Apr. 15, 1924.

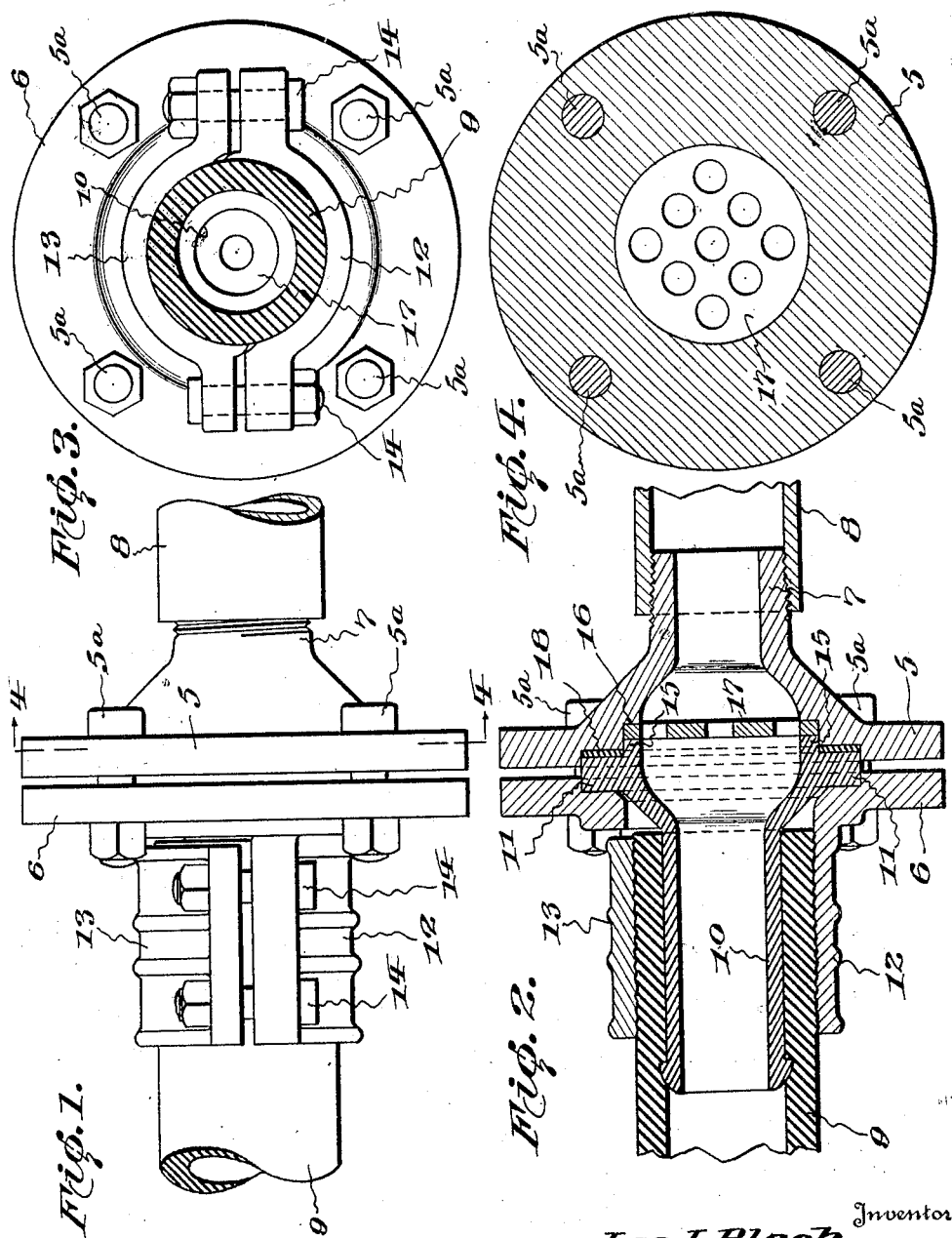

1,490,760

UNITED STATES PATENT OFFICE.

LEE J. BLACK, OF BEAUMONT, TEXAS.

HOSE CONNECTION.

Application filed August 31, 1922. Serial No. 585,362.

*To all whom it may concern:*

Be it known that I, LEE J. BLACK, a citizen of the United States, residing at Beaumont, in the county of Jefferson and State of Texas, have invented certain new and useful Improvements in Hose Connections, of which the following is a specification.

This invention relates to devices for connecting the end of a hose to a pipe or other fixture, the same being designed more particularly for use with hydraulic swivels employed in well-drilling apparatus. It is to be understood however that the invention is capable of use in connection with other apparatus or appliances where a flexible hose is to be coupled or connected to a rigid pipe or the like.

In well-drilling apparatus employing a hydraulic swivel, the water supply hose is swung up to a line of pipe connecting to the swivel which frequently reaches a height of sixty feet in the derrick, and where an ordinary type of clamp is employed the hose often gets detached so that the clamp falls to the derrick floor resulting in serious accidents, and in numerous cases in injury and death to workmen. The present invention has therefore been designed to overcome this defect in the ordinary hose clamps, and to provide a clamp or connection which will securely hold the hose and without danger of any of the parts getting detached and dropping to the derrick floor.

With the object stated in view, the invention consists in a novel combination and arrangement of parts to be hereinafter described and claimed, and in order that the same may be better understood, reference is had to the accompanying drawing, wherein:

Figure 1 is an elevation of the device; Fig. 2 is a central longitudinal section thereof; Fig. 3 is an end view, and Fig. 4 is a cross-section on the line 4—4 of Fig. 1.

Referring specifically to the drawing, 5 and 6 denote two members similar to an ordinary flanged union, The member 5 has a nipple extension 7 which is screw-threaded for connection to a rigid pipe, a fragment of which latter is shown at 8. A fragment of the hose to be coupled is shown at 9.

In the end of the hose 9 is inserted a nozzle or nipple 10 having a flanged outer end 11. This flange 11 seats between the coupling members 5 and 6 and is securely clamped therebetween by the bolts 5ª passing through the flanges of said members.

In order to securely clamp the hose 9 to the internal nipple 10, an external clamp is provided, the same consisting of two oppositely positioned sections 12 and 13, which are semi-circular to fit around the hose, and have ears at their ends to receive bolts 14 whereby the two sections may be drawn together to tightly grip the hose and clamp it on the nipple 10. The member 12 is integral with the member 6 and extends from the outer face thereof, whereas the member 13 is separate. As shown in Fig. 2, the inner surfaces of the members 12 and 13 which engage the hose 9 are corrugated to obtain a firm grip on the hose and prevent the same from slipping.

Between an annular rib 15 on the side of the flange 11 which faces the member 5, and an internal shoulder 16 on said member, is clamped a strainer 17. A gasket 18 is also interposed between the aforementioned side of the flange 11 and the opposite surface of the member 5.

The structure hereinbefore described provides a clamp, a nozzle and a union, which, if the hose does pull out, cannot fall to the derrick floor. The nozzle or nipple flange 11 is firmly held between the members 5 and 6, and hence it cannot get away and fall to the derrick floor. The strainer 17 is also firmly clamped in place so that it cannot get away. The member 5 being connected to a rigid pipe, it is impossible for the same to become detached and drop. The structure therefore makes a very safe and convenient combination of a hose clamp, hose nozzle or nipple, strainer plate and flange union, and when assembled become a one-piece unit performing all the functions of the separate parts mentioned. If the strainer should get clogged, it can be made readily accessible for cleaning by simply removing the bolts 5ª and separating the members 5 and 6.

The structure also enables the device to be connected on one side to an ordinary pipe and on the other side to a hose, and hence it can be readily used in any location where a hose is to be connected to a pipe. If the strainer 17 is not needed it can be removed without affecting the rigidity of the coupling, but a strainer will be found very useful when the device is used in connection with a hydraulic swivel, for preventing obstructions from passing to the bottom of the drill hole and plugging the holes in the bit, thereby necessitating the pulling out of the drill stem in order to remove the obstruction and reestablish a circulation of water.

I claim:

1. A hose connection comprising a flanged union, one of the members of which has an outward nipple extension provided with means for connection with a rigid pipe, and the other member of the union being provided with hose clamping means, and an internal nipple adapted to seat in the hose to be clamped, said nipple projecting from the hose end and having its projecting end provided with a flange which seats between and is clamped by the members of the union.

2. A hose connection comprising a flanged union one of the members of which has an outward nipple extension provided with means for connection with a rigid pipe, and the other member of the union being provided with hose clamping means, an internal nipple adapted to seat in the hose to be clamped, said nipple projecting from the hose end and having its projecting end provided with a flange which seats between and is clamped by the members of the union, the nipple flange having its side which faces the first-mentioned union member provided with an annular rib and said union member having an internal shoulder opposite said flange, and a strainer seating on said shoulder and clamped thereagainst by the rib.

In testimony whereof I affix my signature.

LEE J. BLACK.